(12) United States Patent
Shen et al.

(10) Patent No.: US 10,127,679 B2
(45) Date of Patent: Nov. 13, 2018

(54) IMAGE ALIGNMENT METHOD AND APPARATUS

(71) Applicant: Huawei Technologies Co., Ltd., Shenzhen (CN)

(72) Inventors: Xiaoyong Shen, Hong Kong (CN); Jiaya Jia, Hong Kong (CN); Kwok Wai Hung, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/448,799

(22) Filed: Mar. 3, 2017

(65) Prior Publication Data

US 2017/0178348 A1 Jun. 22, 2017

Related U.S. Application Data

(63) Continuation of application No. PCT/CN2015/075823, filed on Apr. 3, 2015.

(30) Foreign Application Priority Data

Sep. 5, 2014 (CN) .......................... 2014 1 0452309

(51) Int. Cl.
*G06T 7/32* (2017.01)
*G06T 7/13* (2017.01)
(Continued)

(52) U.S. Cl.
CPC .............. *G06T 7/32* (2017.01); *G06T 3/0075* (2013.01); *G06T 5/50* (2013.01); *G06T 7/13* (2017.01);
(Continued)

(58) Field of Classification Search
None
See application file for complete search history.

(56) References Cited

U.S. PATENT DOCUMENTS

| | | | |
|---|---|---|---|
| 6,519,372 B1 * | 2/2003 | Eppler | ................. G06K 9/6203 382/278 |
| 7,894,528 B2 | 2/2011 | Rav-acha | |

(Continued)

FOREIGN PATENT DOCUMENTS

| | | |
|---|---|---|
| CN | 102857704 A | 1/2013 |
| CN | 103325085 A | 9/2013 |

(Continued)

OTHER PUBLICATIONS

S. D. Wei and S. H. Lai, "Robust and Efficient Image Alignment Based on Relative Gradient Matching," in IEEE Transactions on Image Processing, vol. 15, No. 10, pp. 2936-2943, Oct. 2006.*

(Continued)

*Primary Examiner* — Kim Vu
*Assistant Examiner* — Nathan Bloom
(74) *Attorney, Agent, or Firm* — Conley Rose, P.C.

(57) ABSTRACT

An image alignment method and apparatus, where the method and apparatus include obtaining image information of two to-be-aligned images, determining, using a cross-correlation measurement model, first coordinate offset according to the image information of the two images, where the first coordinate offset are used to indicate position deviations of to-be-aligned pixels between the two images in the coordinate system, and aligning the two images according to coordinates of pixels in the first image in the coordinate system and the first coordinate offset.

20 Claims, 4 Drawing Sheets

(51) Int. Cl.
*G06T 7/44* (2017.01)
*G06T 3/00* (2006.01)
*G06T 5/50* (2006.01)

(52) U.S. Cl.
CPC ...... *G06T 7/44* (2017.01); *G06T 2207/10036* (2013.01)

(56) References Cited

U.S. PATENT DOCUMENTS

| | | | | |
|---|---|---|---|---|
| 2007/0183628 | A1* | 8/2007 | Carlson | G01C 11/06 382/103 |
| 2007/0292037 | A1* | 12/2007 | Allon | G06T 7/33 382/238 |
| 2009/0039886 | A1* | 2/2009 | White | G01R 33/28 324/318 |
| 2009/0148051 | A1* | 6/2009 | Pham | G06K 9/32 382/219 |
| 2009/0161988 | A1* | 6/2009 | Wredenhagen | G06T 7/32 382/278 |
| 2009/0232388 | A1* | 9/2009 | Minear | G06T 3/0075 382/154 |
| 2013/0230220 | A1 | 9/2013 | Yu et al. | |
| 2013/0301897 | A1 | 11/2013 | Zhu et al. | |
| 2016/0321809 | A1* | 11/2016 | Chukka | G06K 9/0014 |
| 2016/0335777 | A1* | 11/2016 | Borsdorf | A61B 6/032 |

FOREIGN PATENT DOCUMENTS

| | | |
|---|---|---|
| CN | 103632362 A | 3/2014 |
| CN | 103679714 A | 3/2014 |
| CN | 103793891 A | 5/2014 |
| CN | 103796001 A | 5/2014 |

OTHER PUBLICATIONS

Feng Zhao, Qingming Huang and Wen Gao, "Image Matching by Normalized Cross-Correlation," 2006 IEEE International Conference on Acoustics Speech and Signal Processing Proceedings, Toulouse, 2006, pp. II-II.*

J. Ma, J. C. Chan, and F. Canters, "Fully automatic subpixel image registration of multiangle CHRIS/Proba data," IEEE Trans. Geosci. Remote Sens., vol. 48, No. 7, pp. 2829-2839, Jul. 2010.*

M. Gong, S. Zhao, L. Jiao, D. Tian and S. Wang, "A Novel Coarse-to-Fine Scheme for Automatic Image Registration Based on SIFT and Mutual Information," in IEEE Transactions on Geoscience and Remote Sensing, vol. 52, No. 7, pp. 4328-4338, Jul. 2014.*

Yi, Bo, et al. "A fast matching algorithm with feature points based on NCC." Proc. Int. Academic Workshop on Social Science.Oct. 2013.*

Machine Translation and Abstract of Chinese Publication No. CN103632362, dated Mar. 12, 2014, 28 pages.

Machine Translation and Abstract of Chinese Publication No. CN103679714, dated Mar. 26, 2014, 13 pages.

Machine Translation and Abstract of Chinese Publication No. CN103796001, dated May 14, 2014, 18 pages.

Pluim, J., et al., "Image Registration by Maximization of Combined Mutual Information and Gradient Information," IEEE Transactions on Medical Imaging, vol. 19, No. 8, Aug. 2000, pp. 809-814.

Peng, S., "The High-resolution Synthetic Aperture Radar Interferometry (INSAR) Technique and Its Applications Research," CNKI. Part 1, Jan. 2010. 60 pages.

Peng, S., "The High-resolution Synthetic Aperture Radar Interferometry (INSAR) Technique and Its Applications Research," CNKI. Part 2, Jan. 2010. 60 pages.

Peng, S., "The High-resolution Synthetic Aperture Radar Interferometry (INSAR) Technique and Its Applications Research," CNKI. Part 3, Jan. 2010. 58 pages.

Partial English Translation of Peng, S., "The High-resolution Synthetic Aperture Radar Interferometry (INSAR) Technique and Its Applications Research," CNKI, Jan. 2010. 5 pages.

Foreign Communication From a Counterpart Application, Chinese Application No. 201410452309.4, Chinese Office Action dated Jan. 17, 2018, 4 pages.

Foreign Communication From a Counterpart Application, Chinese Application No. 201410452309.4, Chinese Search Report dated Jan. 4, 2018, 2 pages.

Liu, C., et al., "SIFT Flow: Dense Correspondence across Different Scenes," ECCV, Part III, LNCS 5304, 2008, pp. 28-42.

Foreign Communication From a Counterpart Application, PCT Application No. PCT/CN2015/075823, English Translation of International Search Report dated Jun. 15, 2015, 2 pages.

Foreign Communication From a Counterpart Application, PCT Application No. PCT/CN2015/075823, English Translation of Written Opinion dated Jun. 15, 2015, 2 pages.

* cited by examiner

IMAGE ALIGNMENT METHOD AND APPARATUS

CROSS-REFERENCE TO RELATED APPLICATIONS

This application is a continuation of International Patent Application No. PCT/CN2015/075823 filed on Apr. 3, 2015, which claims priority to Chinese Patent Application No. 201410452309.4 filed on Sep. 5, 2014. The disclosures of the aforementioned applications are hereby incorporated by reference in their entireties.

TECHNICAL FIELD

The present disclosure relates to the field of image processing, and in particular, to an image alignment method and apparatus.

BACKGROUND

An image alignment technology is a foundational technology in the field of image processing. With rapid development of digital imaging, a series of applications based on the image alignment technology have emerged. These applications include generation of a panorama, generation of a highly dynamic image, information fusion of two images, and the like. For example, a color image is restored using an infrared image, or a blur of another color image is removed using an image with noise.

With vigorous development of various image capture devices, how to align multi-modal multi-spectral images becomes a new problem, and these multi-modal multi-spectral images include a near infrared image, a color image, a depth image, a nuclear magnetic resonance image, an ultrasonic image, and the like. Because of different capture devices and a dynamic nature of a capture scenario, there is a great difference in captured images. FIG. 1 shows four groups of common multi-modal multi-spectral images, which are as follows from left to right. The first group includes images with different exposures, the second group includes color and depth images, the third group includes color and near infrared images, and the fourth group includes an image shot when a flash is enabled and an image shot when a flash is disabled. It can be learned from FIG. 1 that main differences between the multi-modal multi-spectral images are as follows, a large color contrast between the images, and large gradient value and gradient direction contrasts between the images.

A conventional alignment technology based on a scale-invariant feature transform (SIFT) feature point has been widely used in the image alignment field. Further, in the technology, images that need to be aligned are matched by searching for the SIFT feature point. Two images are used as an example. According to an image alignment method based on the SIFT feature point, SIFT feature point vectors of the two images are first extracted, and a nearest neighbor is found using a Euclidean distance between the vectors in order to obtain a correspondence between the two images. However, the SIFT feature point is closely related to a gradient value and a gradient direction that are between images, the image alignment technology based on the SIFT feature point greatly depends on gradient value and gradient direction consistencies that are between regions with similar image structures. However, it can be learned from FIG. 1 that, for multi-modal multi-spectral images, there is a relatively large gradient direction contrast between the regions with similar structures. Therefore, the image alignment technology based on the SIFT feature point is not suitable for alignment between the multi-modal multi-spectral images.

SUMMARY

Embodiments of the present disclosure provide an image alignment method and apparatus in order to improve image alignment accuracy.

According to a first aspect, an image alignment method is provided, including obtaining image information of two to-be-aligned images, where image information of a first image includes coordinates of pixels in the first image in a selected coordinate system, pixel values of the pixels in the first image, and a pixel value gradient of the pixels in the first image, and image information of a second image includes pixel values of pixels in the second image and a pixel value gradient of the pixels in the second image, where the two images are located in the coordinate system, determining, using a cross-correlation measurement model, first coordinate offset according to the image information of the two images, where the first coordinate offset are used to indicate position deviations of to-be-aligned pixels between the two images in the coordinate system, and aligning the two images according to the coordinates of the pixels in the first image in the coordinate system and the first coordinate offset.

With reference to the first aspect, in one implementation manner of the first aspect, before determining, using a cross-correlation measurement model, first coordinate offset according to the image information of the two images, the method further includes obtaining image information of a third image, where the image information of the third image includes pixel values of pixels in the third image and a pixel value gradient of the pixels in the third image, the third image is located in the coordinate system, and the first image and the third image are to-be-aligned original images, determining, using the cross-correlation measurement model, a coordinate transformation matrix according to image information of the original images, where the coordinate transformation matrix is used to indicate a spatial position relationship of to-be-aligned pixels between the original images in the coordinate system, determining second coordinate offset according to the coordinate transformation matrix, where the second coordinate offset are used to indicate position deviations of the to-be-aligned pixels between the original images in the coordinate system, and obtaining the second image according to the second coordinate offset and the pixel values of the pixels in the third image.

With reference to any one of the first aspect, or the foregoing implementation manners of the first aspect, in another implementation manner of the first aspect, determining, using the cross-correlation measurement model, a coordinate transformation matrix according to image information of the original images includes determining the coordinate transformation matrix by calculating a minimum value of $$E_1(H) = \sum_p E_2(p, w_p),$$

where $E_2(p,w_p) = \rho(1-|\Phi_I(p,w_p)|) + \tau\rho(1-|\Phi_{\nabla I}(p,w_p)|),$ $$\Phi_I(p, w_p) = \frac{(I_{1,p} - I'_{1,p})^T (I_{3,p} - I'_{3,p})}{\|I_{1,p} - I'_{1,p}\| \|I_{3,p} - I'_{3,p}\|},$$

$$\Phi_{\nabla I}(p, w_p) = \frac{(\nabla I_{1,p} - \nabla I'_{1,p})^T (\nabla I_{3,p} - \nabla I'_{3,p})}{\|\nabla I_{1,p} - \nabla I'_{1,p}\| \|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p, y_p)^T$, and $w_p=(u_p, v_p)^T$, H indicates the coordinate transformation matrix, and H meets $[u_p, v_p, 1]^T = [x_p, y_p, 1]^T (H-I)$, I indicates an identity matrix, p indicates the coordinates of the pixels in the first image in the coordinate system, $x_p$ indicates a horizontal coordinate of p, $y_p$ indicates a vertical coordinate of p, $w_p$ indicates the second coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{3,p}$ indicates a one-dimensional column vector including pixel values of pixels in a $(p+w_p)$-centered image block of the third image, $\nabla I_{3,p}$ indicates a one-dimensional column vector including pixel value gradients of the pixels in the $(p+w_p)$-centered image block, $I'_{3,p}$ indicates a one-dimensional column vector including pixel means of the pixels in the $(p+w_p)$-centered image block, $\nabla I'_{3,p}$ indicates a one-dimensional column vector including pixel value gradient means of the pixels in the $(p+w_p)$-centered image block, and $\beta$ and $\tau$ are constants, where $\beta$ is used to control a shape of a function $\rho(x)$, and $\tau$ is a weight of $\rho(1-|\Phi_{\nabla I}(p, w_p)|)$ in $E_2(p, w_p)\rho(x)$.

With reference to any one of the first aspect, or the foregoing implementation manners of the first aspect, in another implementation manner of the first aspect, the determining second coordinate offset according to the coordinate transformation matrix includes determining the second coordinate offset according to a formula $[u_p, v_p, 1]^T = [x_p, y_p, 1]^T (H-I)$.

With reference to any one of the first aspect, or the foregoing implementation manners of the first aspect, in another implementation manner of the first aspect, obtaining the second image according to the second coordinate offset and the pixel values of the pixels in the third image includes obtaining the second image according to a formula $I_2(p) = I_3(p+w_p)$, where $I_2(p)$ indicates a pixel value of the second image in p, and $I_3(p+w_p)$ indicates a pixel value of the third image in $p+w_p$.

With reference to any one of the first aspect, or the foregoing implementation manners of the first aspect, in another implementation manner of the first aspect, determining, using a cross-correlation measurement model, first coordinate offset according to the image information of the two images includes determining the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p, w'_p) = \rho(1-|\Phi_I(p, w'_p)|) + \tau\rho(1-|\Phi_{\nabla I}(p, w'_p)|)$, $$\Phi_I(p, w'_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w'_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p=(x_p, y_p)^T$, $w'_p=(u'_p, v'_p)^T$, $$\rho(x) = -\frac{1}{\beta}\log(e^{-\beta|x|} + e^{-\beta(2-|x|)}),$$

and $\psi(x^2) = \sqrt{x^2 + \varepsilon^2}$, p indicates the coordinates of the pixels in the first image in the coordinate system, $x_p$ indicates the horizontal coordinate of p, $y_p$ indicates the vertical coordinate of p, $w'_p$ indicates the first coordinate offset, $u'_p$ indicates a horizontal coordinate of $w'_p$, $v'_p$ indicates a vertical coordinate of $w'_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a $(p+w'_p)$-centered image block of the second image, $\nabla I_{2,p}$ indicates a one-dimensional column vector including pixel value gradients of the pixels in the $(p+w'_p)$-centered image block, $I'_{2,p}$ indicates a one-dimensional column vector including pixel means of the pixels in the $(p+w'_p)$-centered image block, $\nabla I'_{2,p}$ indicates a one-dimensional column vector including pixel value gradient means of the pixels in the $(p+w'_p)$-centered image block, $\lambda_1$, $\beta$, $\lambda_2$ and $\tau$ are constants, where $\lambda_1$ and $\lambda_2$ are weights of the second term and the third term that are in $E_3(w'_p)$, $\beta$ is used to control the shape of the function $\rho(x)$, and $\tau$ is the weight of $\rho(1-|\Phi_{\nabla I}(p, w'_p)|)$ in $E_2(p, w'_p)$, N(p) indicates a set including adjacent pixels of a pixel p in the first image, q indicates any pixel in the set, $w_q$ indicates a coordinate offset between q and a to-be-aligned pixel of q in the second image, and $\varepsilon$ is a constant.

With reference to any one of the first aspect, or the foregoing implementation manners of the first aspect, in another implementation manner of the first aspect, the cross-correlation measurement model is as follows $E_2(p, w_p) = \rho(1-|\Phi_I(p, w_p)|) + \tau\rho(1-|\Phi_{\nabla I}(p, w_p)|)$, where $$\Phi_I(p, w_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p=(x_p, y_p)^T$, $w_p=(u_p, v_p)^T$, and $$\rho(x) = -\frac{1}{\beta}\log(e^{-\beta|x|} + e^{-\beta(2-|x|)}),$$

p indicates the coordinates of the pixels in the first image in the coordinate system, $x_p$ indicates the horizontal coordinate of p, $y_p$ indicates the vertical coordinate of p, $w_p$ indicates the first coordinate offset, $u_p$ indicates the horizontal coordinate of $w_p$, $v_p$ indicates the vertical coordinate of $w_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a (p+w$_p$)-centered image block of the second image, $\nabla I_{2,p}$ indicates a one-dimensional column vector including pixel value gradients of the pixels in the (p+w$_p$)-centered image block, $I'_{2,p}$ indicates a one-dimensional column vector including pixel means of the pixels in the (p+w$_p$)-centered image block, $\nabla I'_{2,p}$ indicates a one-dimensional column vector including pixel value gradient means of the pixels in the (p+w$_p$)-centered image block, and β is a weight and is used to control the shape of the function ρ(x).

According to a second aspect, an image alignment apparatus is provided, including a first obtaining unit configured to obtain image information of two to-be-aligned images, where image information of a first image includes coordinates of pixels in the first image in a selected coordinate system, pixel values of the pixels in the first image, and a pixel value gradient of the pixels in the first image, and image information of a second image includes pixel values of pixels in the second image and a pixel value gradient of the pixels in the second image, where the two images are located in the coordinate system, a first determining unit configured to determine, using a cross-correlation measurement model, first coordinate offset according to the image information of the two images, where the first coordinate offset are used to indicate position deviations of to-be-aligned pixels between the two images in the coordinate system, and an alignment unit configured to align the two images according to the coordinates of the pixels in the first image in the coordinate system and the first coordinate offset.

With reference to the second aspect, in one implementation manner of the second aspect, the apparatus further includes a second obtaining unit configured to obtain image information of a third image, where the image information of the third image includes pixel values of pixels in the third image and a pixel value gradient of the pixels in the third image, the third image is located in the coordinate system, and the first image and the third image are to-be-aligned original images, a second determining unit configured to determine, using the cross-correlation measurement model, a coordinate transformation matrix according to image information of the original images, where the coordinate transformation matrix is used to indicate a spatial position relationship of to-be-aligned pixels between the original images in the coordinate system, a third determining unit configured to determine second coordinate offset according to the coordinate transformation matrix, where the second coordinate offset are used to indicate position deviations of the to-be-aligned pixels between the original images in the coordinate system, and a fourth determining unit configured to obtain the second image according to the second coordinate offset and the pixel values of the pixels in the third image.

With reference to any one of the second aspect, or the foregoing implementation manners of the second aspect, in another implementation manner of the second aspect, the second determining unit is further configured to determine the coordinate transformation matrix by calculating a minimum value of $$E_1(H) = \sum_p E_2(p, w_p),$$

where $E_2(p,w_p) = \rho(1-|\Phi_I(p,w_p)|) + \tau\rho(1-|\Phi_{\nabla I}(p,w_p)|)$, $$\Phi_I(p, w_p) = \frac{(I_{1,p} - I'_{1,p})^T(I_{3,p} - I'_{3,p})}{\|I_{1,p} - I'_{1,p}\|\|I_{3,p} - I'_{3,p}\|},$$

$$\Phi_{\nabla I}(p, w_p) = \frac{(\nabla I_{1,p} - \nabla I'_{1,p})^T(\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicates the coordinate transformation matrix, and H meets $[u_p,v_p,1]^T=[x_p,y_p,1]^T(H-I)$, I indicates an identity matrix, P indicates the coordinates of the pixels in the first image in the coordinate system, $x_p$ indicates a horizontal coordinate of p, $y_p$ indicates a vertical coordinate of p, $w_p$ indicates the second coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{3,p}$ indicates a one-dimensional column vector including pixel values of pixels in a (p+w$_p$)-centered image block of the third image, $\nabla I_{3,p}$ indicates a one-dimensional column vector including pixel value gradients of the pixels in the (p+w$_p$)-centered image block, $I'_{3,p}$ indicates a one-dimensional column vector including pixel means of the pixels in the (p+w$_p$)-centered image block, $\nabla I'_{3,p}$ indicates a one-dimensional column vector including pixel value gradient means of the pixels in the (p+w$_p$)-centered image block, and β and τ are constants, where β is used to control a shape of a function ρ(x), and τ is a weight of $\rho(1-|\Phi_{\nabla I}(p,w_p)|$ in $E_2(p,w_p)\rho(x)$.

With reference to any one of the second aspect, or the foregoing implementation manners of the second aspect, in another implementation manner of the second aspect, the third determining unit is further configured to determine the second coordinate offset according to a formula $[u_p,v_p,1]^T=[x_p,y_p,1]^T(H-I)$.

With reference to any one of the second aspect, or the foregoing implementation manners of the second aspect, in another implementation manner of the second aspect, the fourth determining unit is further configured to obtain the second image according to a formula $I_2(p)=I_3(p+w_p)$, where $I_2(p)$ indicates a pixel value of the second image in p, and $I_3(p+w_p)$ indicates a pixel value of the third image in p+w$_p$.

With reference to any one of the second aspect, or the foregoing implementation manners of the second aspect, in another implementation manner of the second aspect, the first determining unit is further configured to determine the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $$E_2(p, w'_p) = \rho(1 - |\Phi_I(p, w'_p)|) + \tau\rho(1 - |\Phi_{\nabla I}(p, w'_p)|),$$

$$\Phi_I(p, w'_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w'_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w'_p=(u'_p,v'_p)^T$, $$\rho(x) = -\frac{1}{\beta}\log(e^{-\beta|x|} + e^{-\beta(2-|x|)}),$$

and $\psi(x^2)=\sqrt{x^2+\varepsilon^2}$, p indicates the coordinates of the pixels in the first image in the coordinate system, $x_p$ indicates the horizontal coordinate of p, $y_p$ indicates the vertical coordinate of p, $w'_p$ indicates the first coordinate offset, $u'_p$ indicates a horizontal coordinate of $w'_p$, $v'_p$ indicates a vertical coordinate of $w'_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a (p+$w'_p$)-centered image block of the second image, $\nabla I_{2,p}$ indicates a one-dimensional column vector including pixel value gradients of the pixels in the (p+$w'_p$)-centered image block, $I'_{2,p}$ indicates a one-dimensional column vector including pixel means of the pixels in the (p+$w'_p$)-centered image block, $\nabla I'_{2,p}$ indicates a one-dimensional column vector including pixel value gradient means of the pixels in the (p+$w'_p$)-centered image block $\lambda_1$, $\beta$, $\lambda_2$ and $\tau$ are constants, where $\lambda_1$ and $\lambda_2$ are weights of the second term and the third term that are in $E_3(w'_p)$, $\beta$ is used to control the shape of the function $\rho(x)$, and $\tau$ is the weight of $\rho(1-|\Phi_{\nabla I}(p,w'_p)|$ in $E_2(p,w'_p)$, N(p) indicates a set including adjacent pixels of a pixel p in the first image, q indicates any pixel in the set, $w_q$ indicates a coordinate offset between q and a to-be-aligned pixel of q in the second image, and $\varepsilon$ is a constant.

With reference to any one of the second aspect, or the foregoing implementation manners of the second aspect, in another implementation manner of the second aspect, the cross-correlation measurement model is as follows, $E_2(p, w_p)=\rho(1-|\Phi_I(p,w_p)|)+\tau\rho(1-|\Phi_{\nabla I}(p,w_p)|)$, where $$\Phi_I(p, w_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w_p=(u_p,v_p)^T$, and $$\rho(x) = -\frac{1}{\beta}\log(e^{-\beta|x|} + e^{-\beta(2-|x|)}),$$

p indicates the coordinates of the pixels in the first image in the coordinate system, $x_p$ indicates the horizontal coordinate of p, $y_p$ indicates the vertical coordinate of p, $w_p$ indicates the first coordinate offset, $u_p$ indicates the horizontal coordinate of $w_p$, $v_p$ indicates the vertical coordinate of $w_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a (p+$w_p$)-centered image block of the second image, $\nabla I_{2,p}$ indicates a one-dimensional column vector including pixel value gradients of the pixels in the (p+$w_p$)-centered image block, $I'_{2,p}$ indicates a one-dimensional column vector including pixel means of the pixels in the (p+$w_p$)-centered image block, $\nabla I'_{2,p}$ indicates a one-dimensional column vector including pixel value gradient means of the pixels in the (p+$w_p$)-centered image block, and $\beta$ is a weight and is used to control the shape of the function $\rho(x)$.

According to the embodiments of the present disclosure, the cross-correlation measurement model is introduced. Because both a color cross-correlation and a gradient cross-correlation that are between images are considered in the cross-correlation measurement model, compared with an existing image alignment technology based on a SIFT feature point, the cross-correlation measurement model is more suitable for alignment between multi-modal multi-spectral images and improves image alignment accuracy.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
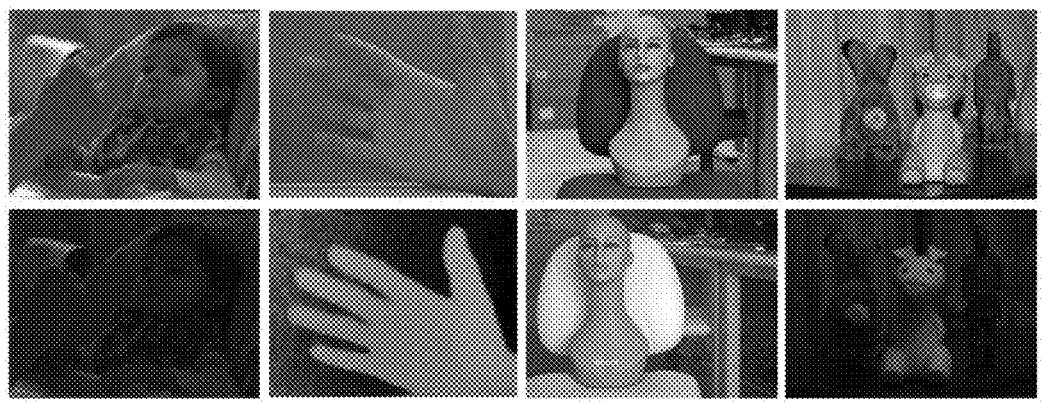
FIG. 1 is an example diagram of multi-modal multi-spectral images.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

In the image alignment field, selection of a structural similarity metric between images is directly related to a final image alignment effect. In the prior art, structural similarity metrics include a color, a gradient, a SIFT feature point, cross-correlation information, and the like. However, because there are relatively large color and gradient direction contrasts between multi-modal multi-spectral images, it is difficult to accurately describe structural similarity between the multi-modal multi-spectral images using any one of the above structural similarity metrics.

According to an embodiment of the present disclosure, a cross-correlation measurement (which may also be referred to as a robust selective standardized cross-correlation measurement) model is introduced to describe structural similarity between images. The cross-correlation measurement model is established based on a color cross-correlation and a gradient cross-correlation that are between the images, or the cross-correlation measurement model is used to indicate a color cross-correlation and a gradient cross-correlation that are between the images. It is assumed that to-be-aligned images include a first image and a second image, the first image is represented by $I_1$, and the second image is represented by $I_2$. The cross-correlation measurement model may be indicated as a formula $$E_2(p, w_p) = \rho(1 - |\Phi_I(p, w_p)|) + \tau\rho(1 - |\Phi_{\nabla I}(p, w_p)|),$$

where $$\Phi_I(p, w_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p=(x_p, y_p)^T$, $w_p=(u_p, v_p)^T$, and $$\rho(x) = -\frac{1}{\beta}\log(e^{-\beta|x|} + e^{-\beta(2-|x|)}),$$

p indicates coordinates of pixels in the first image, and the coordinates may be any one of preselected coordinates, provided that the to-be-aligned images are located in a coordinate system, $x_p$ indicates a horizontal coordinate of p, $y_p$ indicates a vertical coordinate of p, $w_p$ indicates a first coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{2,p}$ indicates a one-dimensional column vector including pixel values of pixels in a $(p+w_p)$-centered image block of the second image, $\nabla I_{2,p}$ indicates a one-dimensional column vector including pixel value gradients of the pixels in the $(p+w_p)$-centered image block, $I'_{2,p}$ indicates a one-dimensional column vector including pixel means of the pixels in the $(p+w_p)$-centered image block, $\nabla I'_{2,p}$ indicates a one-dimensional column vector including pixel value gradient means of the pixels in the $(p+w_p)$-centered image block, and $\beta$ is a weight and is used to control a shape of a function $\rho(x)$.

In the foregoing formula, $\Phi_I(p,w_p)$ is a standardized cross-correlation function, and is used to calculate cross-correlation between color values of the p-centered image block in the first image $I_1$ and the $(p+w_p)$-centered image block in the second image $I_2$. Likewise, $\Phi_{\nabla I}(p,w_p)$ may also be a standardized cross-correlation function, and is used to calculate cross-correlation between gradient values of the p-centered image block in the first image $I_1$ and the $(p+w_p)$-centered image block in the second image $I_2$.

Figures 2A, 2B:
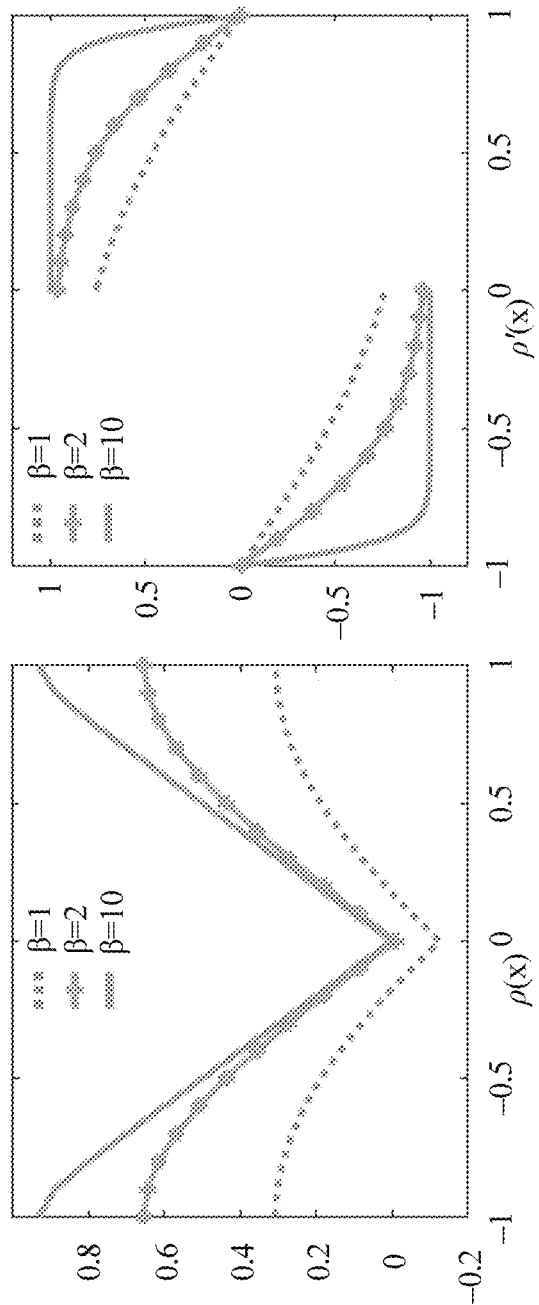
FIG. 2A is a function curve diagram of a robust function.
FIG. 2B is a function curve diagram of the derivative function of the robust function of FIG. 2A.

In addition, the robust function $$\rho(x) = -\frac{1}{\beta}\log(e^{-\beta|x|} + e^{-\beta(2-|x|)})$$

is introduced in a cross-correlation model, and the robust function is a consecutive derivative function. For a function image of the robust function, refer to FIGS. 2A and 2B. FIG. 2A is a function curve of the robust function, and FIG. 2B is a function curve of the derivative function of the robust function. It can be learned from FIGS. 2A and 2B that the robust function is an increasing function of x. However, with increasing of x, a growth speed of the robust function becomes lower, thereby achieving a great robust effect.

Figure 3:
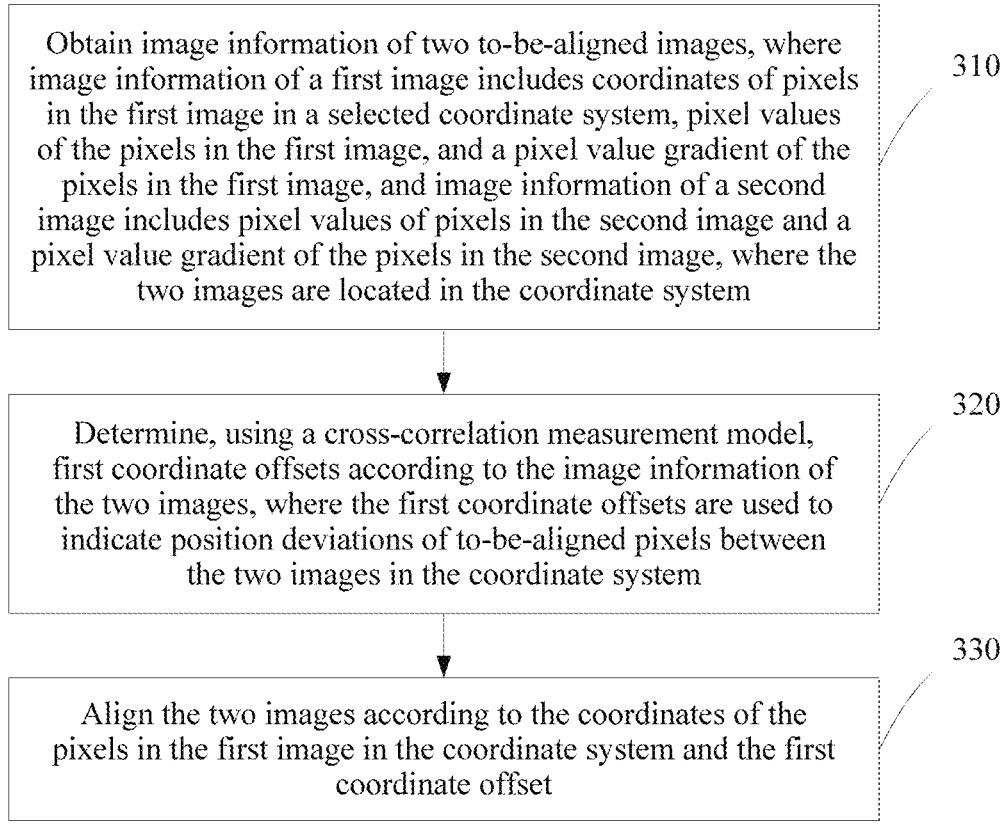
FIG. 3 is a schematic flowchart of an image alignment method according to an embodiment of the present disclosure.

The following describes in detail an image alignment method in an embodiment of the present disclosure with reference to FIG. 3.

FIG. 3 is a schematic flowchart of the image alignment method according to this embodiment of the present disclosure. The method shown in FIG. 3 includes the following steps.

Step 310: Obtain image information of two to-be-aligned images, where image information of a first image includes coordinates of pixels in the first image in a selected coordinate system, pixel values of the pixels in the first image, and a pixel value gradient of the pixels in the first image, and image information of a second image includes pixel values of pixels in the second image and a pixel value gradient of the pixels in the second image, where the two images are located in the coordinate system.

Step 320: Determine, using a cross-correlation measurement model, first coordinate offset according to the image information of the two images, where the first coordinate offset are used to indicate position deviations of to-be-aligned pixels between the two images in the coordinate system.

It should be noted that it is assumed that both the first image and the second image include N pixels. The foregoing pixels in the first image may refer to the N pixels in the first image, and the foregoing pixels in the second image may refer to the N pixels in the second image. Conceptually, the foregoing first coordinate offset may be a set. Further, all the N pixels in the first image may be corresponding to N first coordinate offset.

Step 330: Align the two images according to the coordinates of the pixels in the first image in the coordinate system and the first coordinate offset.

For example, a coordinate point of a pixel in the first image is p, and the first coordinate offset corresponding to p is $w_p$. Step 330 may include, first finding a pixel value x of a coordinate point $p+w_p$ in the second image, and then updating a pixel value y of a coordinate point p in the first image with the pixel value x.

It can be learned from the foregoing that multi-modal multi-spectral images feature large color, gradient value, and gradient direction contrasts. According to this embodiment of the present disclosure, the cross-correlation measurement model is introduced. Because both a color cross-correlation and a gradient cross-correlation that are between images are considered in the cross-correlation measurement model, compared with an existing image alignment technology based on a SIFT feature point, the cross-correlation measurement model is more suitable for alignment between multi-modal multi-spectral images and improves image alignment accuracy.

Optionally, in an embodiment, before step 320, the method shown in FIG. 3 may further include obtaining image information of a third image, where the image information of the third image includes pixel values of pixels in the third image and a pixel value gradient of the pixels in the third image, the third image is located in the coordinate system, and the first image and the third image are to-be-aligned original images, determining, using the cross-correlation measurement model, a coordinate transformation matrix according to image information of the original images, where the coordinate transformation matrix is used to indicate a spatial position relationship of to-be-aligned pixels between the original images in the coordinate system, determining second coordinate offset according to the coordinate transformation matrix, where the second coordinate offset are used to indicate position deviations of the to-be-aligned pixels between the original images in the coordinate system, and obtaining the second image according to the second coordinate offset and the pixel values of the pixels in the third image.

It may be understood that the first image and the third image are the to-be-aligned original images. In this embodiment, an alignment between the first image and the third image is decomposed into two alignments. A global alignment is first performed, and then a pixel-level alignment is performed. After the global alignment, the third image is updated with the second image. The second image is an intermediate image generated in a process of the alignment between the first image and the third image.

It should be noted that the foregoing global alignment between the images is implemented by solving the coordinate transformation matrix. The foregoing coordinate transformation matrix may be a homography matrix, and the coordinate transformation matrix may be used to describe an appropriate alignment between the third image and the first image by means of global translation, rotation, and zooming.

The following gives an embodiment of a process of solving the coordinate transformation matrix.

The coordinate transformation matrix may be solved by calculating a minimum value of an energy function $$E_1(H) = \sum_p E_2(p, w_p),$$

where $E_2(p,w_p) = \rho(1-|\Phi_I(p,w_p)|) + \tau\rho(1-|\Phi_{\nabla I}(p,w_p)|)$, $$\Phi_I(p, w_p) = \frac{(I_{1,p} - I'_{1,p})^T(I_{3,p} - I'_{3,p})}{\|I_{1,p} - I'_{1,p}\|\|I_{3,p} - I'_{3,p}\|},$$

$$\Phi_{\nabla I}(p, w_p) = \frac{(\nabla I_{1,p} - \nabla I'_{1,p})^T(\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicates the coordinate transformation matrix, and H meets $[u_p,v_p,1]^T=[x_p,y_p,1]^T$ (H−I), I indicates an identity matrix, p indicates the coordinates of the pixels in the first image in the coordinate system, $x_p$ indicates a horizontal coordinate of p, $y_p$ indicates a vertical coordinate of p, $w_p$ indicates the second coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{3,p}$ indicates a one-dimensional column vector including pixel values of pixels in a $(p+w_p)$-centered image block of the third image, $\nabla I_{3,p}$ indicates a one-dimensional column vector including pixel value gradients of the pixels in the $(p+w_p)$-centered image block, $I'_{3,p}$ indicates a one-dimensional column vector including pixel means of the pixels in the $(p+w_p)$-centered image block, $\nabla I'_{3,p}$ indicates a one-dimensional column vector including pixel value gradient means of the pixels in the $(p+w_p)$-centered image block, and β and τ are constants, where β is used to control a shape of a function ρ(x), and τ is a weight of $\rho(1-|\Phi_{\nabla I}(p,w_p)|$ in $E_2(p,w_p)$.

It should be noted that in $$E_1(H) = \sum_p E_2(p, w_p),$$

because H meets $[u_p,v_p,1]^T=[x_p,y_p,1]^T$(H−I), $w_p$ is first replaced with H, and then the minimum value of the equation may be solved using a steepest descent method. To further improve efficiency of an algorithm, H may be gradually optimized using an image pyramid method. Further, solving is quickly performed first from a bottom layer (the bottom layer has a lowest resolution) of an image pyramid, then a result is transmitted to an upper layer for further optimization, and finally optimization is performed from a top layer that is of the pyramid and that has a highest resolution. A running speed of the algorithm can be significantly improved using this optimization policy.

After the coordinate transformation matrix is obtained, the determining second coordinate offset according to the coordinate transformation matrix may include determining the second coordinate offset according to a formula $[u_p,v_p,1]^T=[x_p,y_p,1]^T$(H−I).

Further, after H is determined, the second coordinate offset $(u_p,v_p)$ corresponding to pixels are calculated by substituting the coordinates $(x_p,y_p)$ of the pixels in the first image into the above formula.

After the second coordinate offset are obtained, the second image is obtained according to a formula $I_2(p)=I_3(p+w_p)$, where $I_2(p)$ indicates a pixel value of the second image in p, and $I_3(p+w_p)$ indicates a pixel value of the third image in $p+w_p$. In this case, the foregoing second image is obtained.

After the global alignment between the images is completed, the pixel-level alignment may be performed. Further, the first coordinate offset may be determined according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p,w'_p)=\rho(1-|\Phi_I(p,w'_p)|)+\tau\rho(1-|\Phi_{\nabla I}(p,w'_p)|)$, $$\Phi_I(p, w'_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w'_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w'_p=(u'_p,v'_p)^T$, $$\rho(x) = -\frac{1}{\beta}\log(e^{-\beta|x|} + e^{-\beta(2-|x|)}),$$

and $\psi(x^2)=\sqrt{x^2+\varepsilon^2}$, p indicates the coordinates of the pixels in the first image in the coordinate system, $x_p$ indicates the horizontal coordinate of p, $y_p$ indicates the vertical coordinate of p, $w'_p$ indicates the first coordinate offset, $u'_p$ indicates a horizontal coordinate of $w'_p$, $v'_p$ indicates a vertical coordinate of $w'_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a $(p+w_p)$-centered image block of the second image, $\nabla I_{2,p}$ indicates a one-dimensional column vector including pixel value gradients of the pixels in the $(p+w_p)$-centered image block, $I'_{2,p}$ indicates a one-dimensional column vector including pixel means of the pixels in the $(p+w_p)$-centered image block, $\nabla I'_{2,p}$ indicates a one-dimensional column vector including pixel value gradient means of the pixels in the $(p+w'_p)$-centered image block, $\lambda_1$, $\beta$, $\lambda_2$ and $\tau$ are constants, where $\lambda_1$ and $\lambda_2$ are weights of the second term and the third term that are in $E_3(w'_p)$, $\beta$ is used to control the shape of the function $\rho(x)$, and $\tau$ is the weight of $\rho(1-|\Phi_{\nabla I}(p,w'_p)|$ in $E_2(p,w'_p)$, N(p) indicates a set including adjacent pixels of a pixel p in the first image, q indicates any pixel in the set, $w_q$ indicates a coordinate offset between q and a to-be-aligned pixel of q in the second image, and $\varepsilon$ is a constant.

Further, the alignment between the first image and the second image may be performed using the first term $$\sum_p E_2(p, w'_p)$$

in $$E_3(w'_p) = \sum_p E_2(p, w'_p) + \lambda_1\sum_p \psi(\|\nabla w'_p\|^2) + \lambda_2 \sum_p \sum_{q\in N(p)}\|w'_p - w'_q\|$$

and under a constraint of the cross-correlation measurement model. The second term $$\lambda_1\sum_p \psi(\|\nabla w'_p\|^2)$$

and the third term $$\lambda_2\sum_p \sum_{q\in N(p)}\|w'_p - w'_q\|$$

are regular terms, and smoothness of the offsets $w'_p$ between pixels can be ensured using the second term and the third term. Piecewise smoothness of the offsets $w'_p$ between the pixels can be ensured using the second term, where $\psi(x^2)=\sqrt{x^2+\varepsilon^2}$ is a robust function, and $\varepsilon$ is a relatively small constant and may be 1E-4. The third term is a median filtering term, and is used to improve smoothness of $w'_p$ and improve accuracy of solving $w'_p$.

In addition, how to solve the energy function is a variational problem, and solving may be performed using an Euler-Lagrange equation. To accelerate the solving, a process of solving from a rough layer to a fine layer may be used. Further, Gaussian pyramids of the first image and the second image may be first established, and solving starting from a roughest layer of each of the Gaussian pyramids. Then, a result of a rough layer is transmitted to a fine layer, and is used as an initial value of the fine layer for further solving until the result is transmitted to a finest layer (i.e. an original image). The running speed of the algorithm can be significantly improved, and a relatively large $w'_p$ can be accurately solved using a solving policy.

It should be understood that, in various embodiments of the present disclosure, sequence numbers of the foregoing processes do not mean execution sequences. The execution sequences of the processes should be determined according to functions and internal logic thereof, and should not be construed as any limitation on the implementation processes of the embodiments of the present disclosure.

The foregoing describes in detail the image alignment method according to the embodiments of the present disclosure with reference to FIG. 1 to FIG. 3. The following describes in detail image alignment apparatuses according to the embodiments of the present disclosure with reference to FIG. 4 and FIG. 5.

Figure 4:
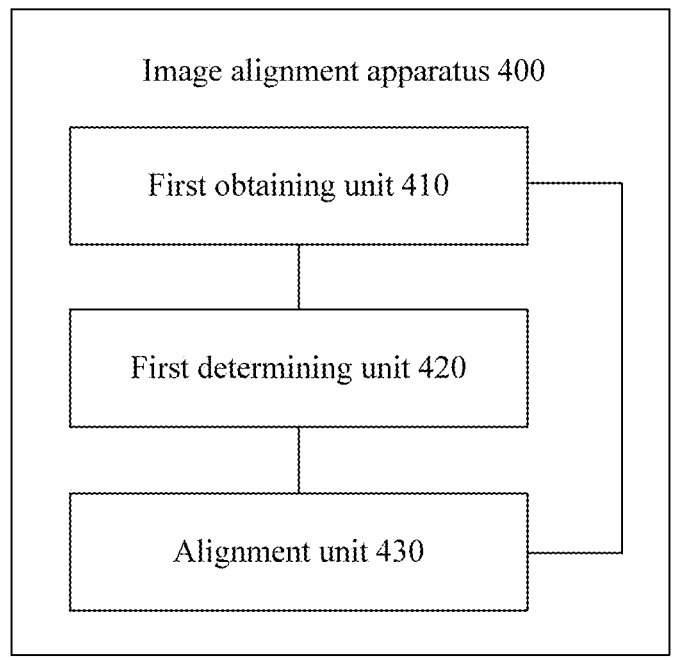
FIG. 4 is a schematic block diagram of an image alignment apparatus according to an embodiment of the present disclosure.
Figure 5:
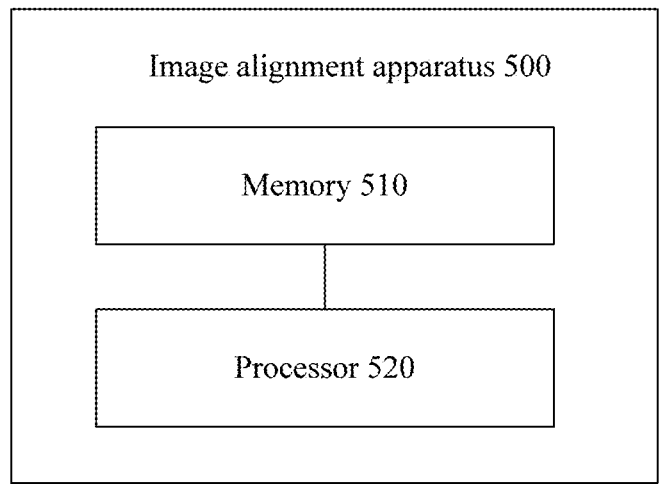
FIG. 5 is a schematic block diagram of an image alignment apparatus according to an embodiment of the present disclosure.

It should be understood that the apparatuses in FIG. 4 and FIG. 5 can implement steps in FIG. 3. To avoid repetition, details are not described herein again.

FIG. 4 is a schematic block diagram of an image alignment apparatus according to an embodiment of the present disclosure. The apparatus 400 in FIG. 4 includes a first obtaining unit 410 configured to obtain image information of two to-be-aligned images, where image information of a first image includes coordinates of pixels in the first image in a selected coordinate system, pixel values of the pixels in the first image, and a pixel value gradient of the pixels in the first image, and image information of a second image includes pixel values of pixels in the second image and a pixel value gradient of the pixels in the second image, where the two images are located in the coordinate system, a first determining unit 420 configured to determine, using a cross-correlation measurement model, first coordinate offset according to the image information of the two images, where the first coordinate offset are used to indicate position deviations of to-be-aligned pixels between the two images in the coordinate system, and an alignment unit 430 configured to align the two images according to the coordinates of the pixels in the first image in the coordinate system and the first coordinate offset.

According to this embodiment of the present disclosure, the cross-correlation measurement model is introduced. Because both a color cross-correlation and a gradient cross-correlation that are between images are considered in the cross-correlation measurement model, compared with an existing image alignment technology based on a SIFT feature point, the cross-correlation measurement model is more suitable for alignment between multi-modal multi-spectral images and improves image alignment accuracy.

Optionally, in an embodiment, the apparatus 400 may further include a second obtaining unit (not shown) configured to obtain image information of a third image, where the image information of the third image includes pixel values of pixels in the third image and a pixel value gradient of the pixels in the third image, the third image is located in the coordinate system, and the first image and the third image are to-be-aligned original images, a second determining unit (not shown) configured to determine, using the cross-correlation measurement model, a coordinate transformation matrix according to image information of the original images, where the coordinate transformation matrix is used to indicate a spatial position relationship of to-be-aligned pixels between the original images in the coordinate system, a third determining unit (not shown) configured to determine second coordinate offset according to the coordinate transformation matrix, where the second coordinate offset are used to indicate position deviations of the to-be-aligned pixels between the original images in the coordinate system, and a fourth determining unit (not shown) configured to obtain the second image according to the second coordinate offset and the pixel values of the pixels in the third image.

Optionally, in an embodiment, the second determining unit is further configured to determine the coordinate transformation matrix by calculating a minimum value of $$E_1(H) = \sum_p E_2(p, w_p),$$

where $E_2(p,w_p) = \rho(1-|\Phi_I(p,w_p)|) + \tau\rho(1-|\Phi_{\nabla I}(p,w_p)|)$, $$\Phi_I(p, w_p) = \frac{(I_{1,p} - I'_{1,p})^T (I_{3,p} - I'_{3,p})}{\|I_{1,p} - I'_{1,p}\|\|I_{3,p} - I'_{3,p}\|},$$

$$\Phi_{\nabla I}(p, w_p) = \frac{(\nabla I_{1,p} - \nabla I'_{1,p})^T (\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicates the coordinate transformation matrix, and H meets $[u_p,v_p,1]^T=[x_p,y_p,1]^T$ (H−I), I indicates an identity matrix, p indicates the coordinates of the pixels in the first image in the coordinate system, $x_p$ indicates a horizontal coordinate of p, $y_p$ indicates a vertical coordinate of p, $w_p$ indicates the second coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I'_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{3,p}$ indicates a one-dimensional column vector including pixel values of pixels in a (p+$w_p$)-centered image block of the third image, $\nabla I_{3,p}$ indicates a one-dimensional column vector including pixel value gradients of the pixels in the (p+$w_p$)-centered image block, $I'_{3,p}$ indicates a one-dimensional column vector including pixel means of the pixels in the (p+$w_p$)-centered image block, $\nabla I'_{3,p}$ indicates a one-dimensional column vector including pixel value gradient means of the pixels in the (p+$w_p$)-centered image block, and β and $\tau$ are constants, where β is used to control a shape of a function ρ(x), and $\tau$ is a weight of $\rho(1-|\Phi_{\nabla I}(p,w_p)|)$ in $E_2(p,w_p)$.

Optionally, in an embodiment, the third determining unit is further configured to determine the second coordinate offset according to a formula $[u_p,v_p,1]^T=[x_p,y_p,1]^T(H-I)$.

Optionally, in an embodiment, the fourth determining unit is further configured to obtain the second image according to a formula $I_2(p)=I_3(p+w_p)$, where $I_2(p)$ indicates a pixel value of the second image in p, and $I_3(p+w_p)$ indicates a pixel value of the third image in p+$w_p$.

Optionally, in an embodiment, the first determining unit 420 is further configured to determine the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p,w'_p) = \rho(1-|\Phi_I(p,w'_p)|) + \tau\rho(1-|\Phi_{\nabla I}(p,w'_p)|)$, $$\Phi_I(p, w'_p) = \frac{(I_{1,p} - I'_{1,p})^T (I_{2,p} - I'_{2,p})}{\|I_{1,p} - I'_{1,p}\|\|I_{2,p} - I'_{2,p}\|},$$

$$\Phi_{\nabla I}(p, w'_p) = \frac{(\nabla I_{1,p} - \nabla I'_{1,p})^T (\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w'_p=(u'_p,v'_p)^T$, $$\rho(x) = -\frac{1}{\beta}\log(e^{-\beta|x|} + e^{-\beta(2-|x|)}),$$

and $\psi(x^2)=\sqrt{x^2+\varepsilon^2}$, p indicates the coordinates of the pixels in the first image in the coordinate system, $x_p$ indicates the horizontal coordinate of p, $y_p$ indicates the vertical coordinate of p, $w'_p$ indicates the first coordinate offset, $u'_p$ indicates a horizontal coordinate of $w'_p$, $v'_p$ indicates a vertical coordinate of $w'_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a (p+$w'_p$)-centered image block of the second image, $\nabla I_{2,p}$ indicates a one-dimensional column vector including pixel value gradients of the pixels in the (p+$w'_p$)-centered image block, $I'_{2,p}$ indicates a one-dimensional column vector including pixel means of the pixels in the (p+$w'_p$)-centered image block, $\nabla I'_{2,p}$ indicates a one-dimensional column vector including pixel value gradient means of the pixels in the (p+$w'_p$)-centered image block, $\lambda_1$, β, $\lambda_2$ and $\tau$ are constants, where $\lambda_1$ and $\lambda_2$ are weights of the second term and the third term that are in $E_3(w'_p)$, β is used to control the shape of the function ρ(x), and τ is the weight of $\rho(1-|\Phi_{\nabla I}(p,w'_p)|)$ in $E_2(p,w'_p)$, N(p) indicates a set including adjacent pixels of a pixel p in the first image, q indicates any pixel in the set, $w_q$ indicates a coordinate offset between q and a to-be-aligned pixel of q in the second image, and ε is a constant.

Optionally, in an embodiment, the cross-correlation measurement model is $E_2(p,w_p)=\rho(1-|\Phi_I(p,w_p)|)+\tau\rho(1-|\Phi_{\nabla I}(p,w_p)|)$, where $$\Phi_I(p, w_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w_p=(u_p,v_p)^T$, and $$\rho(x) = -\frac{1}{\beta}\log(e^{-\beta|x|} + e^{-\beta(2-|x|)}),$$

p indicates the coordinates of the pixels in the first image in the coordinate system, $x_p$ indicates the horizontal coordinate of p, $y_p$ indicates the vertical coordinate of p, $w_p$ indicates the first coordinate offset, $u_p$ indicates the horizontal coordinate of $w_p$, $v_p$ indicates the vertical coordinate of $w_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a $(p+w_p)$-centered image block of the second image, $\nabla I_{2,p}$ indicates a one-dimensional column vector including pixel value gradients of the pixels in the $(p+w_p)$-centered image block, $I'_{2,p}$ indicates a one-dimensional column vector including pixel means of the pixels in the $(p+w_p)$-centered image block, $\nabla I'_{2,p}$ indicates a one-dimensional column vector including pixel value gradient means of the pixels in the $(p+w_p)$-centered image block, and β is a weight and is used to control the shape of the function ρ(x).

FIG. 5 is a schematic block diagram of an image alignment apparatus according to an embodiment of the present disclosure. The apparatus 500 in FIG. 5 includes a memory 510 configured to store a program, and a processor 520 configured to execute the program. When the program is executed, the processor 520 is configured to obtain image information of two to-be-aligned images, where image information of a first image includes coordinates of pixels in the first image in a selected coordinate system, pixel values of the pixels in the first image, and a pixel value gradient of the pixels in the first image, and image information of a second image includes pixel values of pixels in the second image and a pixel value gradient of the pixels in the second image, where the two images are located in the coordinate system, determine, using a cross-correlation measurement model, first coordinate offset according to the image information of the two images, where the first coordinate offset are used to indicate position deviations of to-be-aligned pixels between the two images in the coordinate system, and align the two images according to the coordinates of the pixels in the first image in the coordinate system and the first coordinate offset.

According to this embodiment of the present disclosure, the cross-correlation measurement model is introduced. Because both a color cross-correlation and a gradient cross-correlation that are between images are considered in the cross-correlation measurement model, compared with an existing image alignment technology based on a SIFT feature point, the cross-correlation measurement model is more suitable for alignment between multi-modal multi-spectral images and improves image alignment accuracy.

Optionally, in an embodiment, the processor 520 may be further configured to obtain image information of a third image, where the image information of the third image includes pixel values of pixels in the third image and a pixel value gradient of the pixels in the third image, the third image is located in the coordinate system, and the first image and the third image are to-be-aligned original images, determine, using the cross-correlation measurement model, a coordinate transformation matrix according to image information of the original images, where the coordinate transformation matrix is used to indicate a spatial position relationship of to-be-aligned pixels between the original images in the coordinate system, determine second coordinate offset according to the coordinate transformation matrix, where the second coordinate offset are used to indicate position deviations of the to-be-aligned pixels between the original images in the coordinate system, and obtain the second image according to the second coordinate offset and the pixel values of the pixels in the third image.

Optionally, in an embodiment, the processor 520 is further configured to determine the coordinate transformation matrix by calculating a minimum value of $$E_1(H) = \sum_p E_2(p, w_p),$$

where $E_2(p,w_p)=\rho(1-|\Phi_I(p,w_p)|)+\tau\rho(1-|\Phi_{\nabla I}(p,w_p)|)$, $$\Phi_I(p, w_p) = \frac{(I_{1,p} - I'_{1,p})^T(I_{3,p} - I'_{3,p})}{\|I_{1,p} - I'_{1,p}\|\|I_{3,p} - I'_{3,p}\|},$$

$$\Phi_{\nabla I}(p, w_p) = \frac{(\nabla I_{1,p} - \nabla I'_{1,p})^T(\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicates the coordinate transformation matrix, and H meets $[u_p,v_p,1]^T=[x_p,y_p,1]^T(H-I)$, I indicates an identity matrix, p indicates the coordinates of the pixels in the first image in the coordinate system, $x_p$ indicates a horizontal coordinate of p, $y_p$ indicates a vertical coordinate of p, $w_p$ indicates the second coordinate offset, $u_p$ indicates a horizontal coordinate of $w_p$, $v_p$ indicates a vertical coordinate of $w_p$, $I_{1,p}$ indicates a one-dimensional column vector including pixel values of pixels in a p-centered image block of the first image, $\nabla I_{1,p}$ indicates a one-dimensional column vector including pixel value gradients of the pixels in the image block, $I'_{1,p}$ indicates a one-dimensional column vector including pixel means of the pixels in the image block, $\nabla I'_{1,p}$ indicates a one-dimensional column vector including pixel value gradient means of the pixels in the image block, $I_{3,p}$ indicates a one-dimensional column vector including pixel values of pixels in a $(p+w_p)$-centered image block of the third image, $\nabla I_{3,p}$ indicates a one-dimensional column vector including pixel value gradients of the pixels in the $(p+w_p)$-centered image block, $I'_{3,p}$ indicates a one-dimensional column vector including pixel means of the pixels in the $(p+w_p)$-centered image block, $\nabla I'_{3,p}$ indicates a one-dimensional column vector including pixel value gradient means of the pixels in the $(p+w_p)$-centered image block, and $\beta$ and $\tau$ are constants, where $\beta$ is used to control a shape of a function $\rho(x)$, and $\tau$ is a weight of $\rho(1-|\Phi_{\nabla I}(p,w_p)|)$ in $E_2(p,w_p)$.

Optionally, in an embodiment, the processor 520 is further configured to determine the second coordinate offset according to a formula $[u_p,v_p,1]^T=[x_p,y_p,1]^T(H-I)$.

Optionally, in an embodiment, the processor 520 is further configured to obtain the second image according to a formula $I_2(p)=I_3(p+w_p)$, where $I_2(p)$ indicates a pixel value of the second image in p, and $I_3(p+w_p)$ indicates a pixel value of the third image in $p+w_p$.

Optionally, in an embodiment, the processor 520 is further configured to determine the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p,w'_p)=\rho(1-|\Phi_I(p,w'_p)|)+\tau\rho(1-|\Phi_{\nabla I}(p,w'_p)|)$, $$\Phi_I(p, w'_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w'_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w'_p=(u'_p,v'_p)^T$, $$\rho(x) = -\frac{1}{\beta}\log(e^{-\beta|x|} + e^{-\beta(2-|x|)}),$$

and $\psi(x^2)=\sqrt{x^2+\varepsilon^2}$, p indicates the coordinates of the pixels in the first image in the coordinate system, $x_p$ indicates the horizontal coordinate of p, $y_p$ indicates the vertical coordinate of p, $w'_p$ indicates the first coordinate offset, $u'_p$ indicates a horizontal coordinate of $w'_p$, $v'_p$ indicates a vertical coordinate of $w'_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a $(p+w'_p)$-centered image block of the second image, $\nabla I_{2,p}$ indicates a one-dimensional column vector including pixel value gradients of the pixels in the $(p+w'_p)$-centered image block, $I'_{2,p}$ indicates a one-dimensional column vector including pixel means of the pixels in the $(p+w'_p)$-centered image block, $\nabla I'_{2,p}$ indicates a one-dimensional column vector including pixel value gradient means of the pixels in the $(p+w'_p)$-centered image block, $\lambda_1$, $\beta$, $\lambda_2$ and $\tau$ are constants, where $\lambda_1$ and $\lambda_2$ are weights of the second term and the third term that are in $E_3(w'_p)$, $\beta$ is used to control the shape of the function $\rho(x)$, and $\tau$ is the weight of $\rho(1-|\Phi_{\nabla I}(p,w'_p)|$ in $E_2(p,w'_p)$, N(p) indicates a set including adjacent pixels of a pixel p in the first image, q indicates any pixel in the set, $w_q$ indicates a coordinate offset between q and a to-be-aligned pixel of q in the second image, and $\varepsilon$ is a constant.

Optionally, in an embodiment, the cross-correlation measurement model is $E_2(p,w_p)=\rho(1-|\Phi_I(p,w_p)|)+\tau\rho(1-|\Phi_{\nabla I}(p,w_p)|)$, where $$\Phi_I(p, w_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w_p=(u_p,v_p)^T$, and $$\rho(x) = -\frac{1}{\beta}\log(e^{-\beta|x|} + e^{-\beta(2-|x|)}),$$

p indicates the coordinates of the pixels in the first image in the coordinate system, $x_p$ indicates the horizontal coordinate of p, $y_p$ indicates the vertical coordinate of p, $w_p$ indicates the first coordinate offset, $u_p$ indicates the horizontal coordinate of $w_p$, $v_p$ indicates the vertical coordinate of $w_p$, $I_{1,p}$ indicates the one-dimensional column vector including the pixel values of the pixels in the p-centered image block of the first image, $\nabla I_{1,p}$ indicates the one-dimensional column vector including the pixel value gradients of the pixels in the image block, $I'_{1,p}$ indicates the one-dimensional column vector including the pixel means of the pixels in the image block, $\nabla I'_{1,p}$ indicates the one-dimensional column vector including the pixel value gradient means of the pixels in the image block, $I_{2,p}$ indicates a one-dimensional column vector including pixel values of pixels in a $(p+w_p)$-centered image block of the second image, $\nabla I_{2,p}$ indicates a one-dimensional column vector including pixel value gradients of the pixels in the $(p+w_p)$-centered image block, $I'_{2,p}$ indicates a one-dimensional column vector including pixel means of the pixels in the $(p+w_p)$-centered image block, $\nabla I'_{2,p}$ indicates a one-dimensional column vector including pixel value gradient means of the pixels in the $(p+w_p)$-centered image block, and $\beta$ is a weight and is used to control the shape of the function $\rho(x)$.

It should be understood that, the term "and/or" in this embodiment of the present disclosure describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A computer-implemented image alignment method, comprising:
    obtaining image information of two to-be-aligned images, image information of a first image comprising coordinates of pixels in the first image in a selected coordinate system, pixel values of the pixels in the first image, and a pixel value gradient of the pixels in the first image, image information of a second image comprising pixel values of pixels in the second image and a pixel value gradient of the pixels in the second image, and the two images being located in the selected coordinate system;
    determining, using a cross-correlation measurement model based on a color cross-correlation and a weighted gradient cross-correlation, first coordinate offset according to the image information of the two images, the first coordinate offset indicating position deviations of to-be-aligned pixels between the two images in the selected coordinate system; and
    aligning the two images according to the coordinates of the pixels in the first image in the selected coordinate system and the first coordinate offset.

2. The method according to claim 1, wherein before determining the first coordinate offset, the method further comprises:
    obtaining image information of a third image, the image information of the third image comprising pixel values of pixels in the third image and a pixel value gradient of the pixels in the third image, the third image being located in the selected coordinate system, and the first image and the third image being to-be-aligned original images;
    determining, using the cross-correlation measurement model, a coordinate transformation matrix according to image information of the to-be-aligned original images, the coordinate transformation matrix indicating a spatial position relationship of to-be-aligned pixels between the to-be-aligned original images in the selected coordinate system;
    determining second coordinate offset according to the coordinate transformation matrix, the second coordinate offset being used to indicate position deviations of the to-be-aligned pixels between the to-be-aligned original images in the selected coordinate system; and
    obtaining the second image according to the second coordinate offset and the pixel values of the pixels in the third image.

3. The method according to claim 2, wherein determining the coordinate transformation matrix comprises determining the coordinate transformation matrix by calculating a minimum value of $$E_1(H) = \sum_p E_2(p, w_p),$$

where $E_2(p,w_p) = \rho(1-|\Phi_I(p,w_p)|) + \tau\rho(1-|\Phi_{\nabla I}(p,w_p)|),$ $$\Phi_I(p, w_p) = \frac{(I_{1,p} - I'_{1,p})^T (I_{3,p} - I'_{3,p})}{\|I_{1,p} - I'_{1,p}\| \|I_{3,p} - I'_{3,p}\|},$$

$$\Phi_{\nabla I}(p, w_p) = \frac{(\nabla I_{1,p} - \nabla I'_{1,p})^T(\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicating the coordinate transformation matrix, and meeting $[u_p,v_p,1]^T=[x_p,y_p,1]^T$ (H−I), I indicating an identity matrix, p indicating the coordinates of the pixels in the first image in the selected coordinate system, $x_p$ indicating a horizontal coordinate of p, $y_p$ indicating a vertical coordinate of p, $w_p$ indicating the second coordinate offset, $u_p$ indicating a horizontal coordinate of $w_p$, $v_p$ indicating a vertical coordinate of $w_p$, $I_{1,p}$ indicating a one-dimensional column vector comprising pixel values of pixels in a p-centered image block of the first image, $\nabla I_{1,p}$ indicating a one-dimensional column vector comprising pixel value gradients of the pixels in the image block, $I'_{1,p}$ indicating a one-dimensional column vector comprising pixel means of the pixels in the image block, $\nabla I'_{1,p}$ indicating a one-dimensional column vector comprising pixel value gradient means of the pixels in the image block, $I_{3,p}$ indicating a one-dimensional column vector comprising pixel values of pixels in a (p+$w_p$)-centered image block of the third image, $\nabla I_{3,p}$ indicating a one-dimensional column vector comprising pixel value gradients of the pixels in the (p+$w_p$)-centered image block, $I'_{3,p}$ indicating a one-dimensional column vector comprising pixel means of the pixels in the (p+$w_p$)-centered image block, $\nabla I'_{3,p}$ indicating a one-dimensional column vector comprising pixel value gradient means of the pixels in the (p+$w_p$)-centered image block, β and $\tau$ being constants, β controlling a shape of a function ρ(x), and $\tau$ being a weight of $\rho(1-|\Phi_{\nabla I}(p,w_p)|$ in $E_2(p,w_p)$.

4. The method according to claim 3, wherein determining the second coordinate offset comprises determining the second coordinate offset according to a formula $[u_p,v_p,1]^T=[x_p,y_p,1]^T$(H−I).

5. The method according to claim 4, wherein obtaining the second image comprises obtaining the second image according to a formula $I_2(p)=I_3(p+w_p)$, $I_2(p)$ indicating a pixel value of the second image in p, and $I_3(p+w_p)$ indicating a pixel value of the third image in p+$w_p$.

6. The method according to claim 1, wherein determining the first coordinate offset comprises determining the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p,w'_p)=\rho(1-|\Phi_I(p,w'_p)|)+\tau\rho(1-|\Phi_{\nabla I}(p,w'_p)|)$, $$\Phi_I(p, w'_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w'_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w'_p=(u'_p,v'_p)^T$, $$\rho(x) = -\frac{1}{\beta}\log(e^{-\beta|x|} + e^{-\beta(2-|x|)}),$$

and $\psi(x^2)=\sqrt{x^2+\varepsilon^2}$, p indicating the coordinates of the pixels in the first image in the selected coordinate system, $x_p$ indicating a horizontal coordinate of p, $y_p$ indicating a vertical coordinate of p, $w'_p$ indicating the first coordinate offset, $u'_p$ indicating a horizontal coordinate of $w'_p$, $v'_p$ indicating a vertical coordinate of $w'_p$, $I_{1,p}$ indicating a one-dimensional column vector comprising pixel values of pixels in a p-centered image block of the first image, $\nabla I_{1,p}$ indicating a one-dimensional column vector comprising pixel value gradients of the pixels in the image block, $I'_{1,p}$ indicating a one-dimensional column vector comprising pixel means of the pixels in the image block, $\nabla I'_{1,p}$ indicating a one-dimensional column vector comprising pixel value gradient means of the pixels in the image block, $I_{2,p}$ indicating a one-dimensional column vector comprising pixel values of pixels in a (p+$w'_p$)-centered image block of the second image, $\nabla I_{2,p}$ indicating a one-dimensional column vector comprising pixel value gradients of the pixels in the (p+$w'_p$)-centered image block, $I'_{2,p}$ indicating a one-dimensional column vector comprising pixel means of the pixels in the (p+$w'_p$)-centered image block, $\nabla I'_{2,p}$ indicating a one-dimensional column vector comprising pixel value gradient means of the pixels in the (p+$w'_p$)-centered image block, $\lambda_1$, β, $\lambda_2$ and $\tau$ being constants, $\lambda_1$ and $\lambda_2$ being weights of the second term and the third term in $E_3(w'_p)$, β controlling the shape of the function ρ(x), $\tau$ being the weight of $\rho(1-|\Phi_{\nabla I}(p,w'_p)|$ in $E_2(p,w'_p)$, N(p) indicating a set comprising adjacent pixels of a pixel p in the first image, q indicating any pixel in the set, $w_q$ indicating a coordinate offset between q and a to-be-aligned pixel of q in the second image, and ε being a constant.

7. The method according to claim 1, wherein the cross-correlation measurement model comprises $E_2(p,w_p)=\rho(1-|\Phi_I(p,w_p)|)+\tau\rho(1-|\nabla I(p,w_p)|)$, where $$\Phi_I(p, w_p) = \frac{(I_{1,p} - I'_{1,p})^T(I_{2,p} - I'_{2,p})}{\|I_{1,p} - I'_{1,p}\|\|I_{2,p} - I'_{2,p}\|},$$

$$\Phi_{\nabla I}(p, w_p) = \frac{(\nabla I_{1,p} - \nabla I'_{1,p})^T(\nabla I_{2,p} - \nabla I'_{2,p})}{\|\nabla I_{1,p} - \nabla I'_{1,p}\|\|\nabla I_{2,p} - \nabla I'_{2,p}\|},$$

$p=(x_p,y_p)^T$, $w_p=(u_p,v_p)^T$, and $$\rho(x) = -\frac{1}{\beta}\log(e^{-\beta|x|} + e^{-\beta(2-|x|)}),$$

p indicating the coordinates of the pixels in the first image in the selected coordinate system, $w_p$ indicating a horizontal coordinate of p, $y_p$ indicating a vertical coordinate of p, $w_p$ indicating the first coordinate offset, $u_p$ indicating a horizontal coordinate of $w_p$, $v_p$ indicating a vertical coordinate of $w_p$, $I_{1,p}$ indicating a one-dimensional column vector comprising pixel values of pixels in the p-centered image block of the first image, $\nabla I_{1,p}$ indicating a one-dimensional column vector comprising pixel value gradients of the pixels in the image block, $I'_{1,p}$ indicating a one-dimensional column vector comprising the pixel means of the pixels in the image block, $\nabla I'_{1,p}$ indicating a one-dimensional column vector comprising pixel value gradient means of the pixels in the image block, $I_{2,p}$ indicating a one-dimensional column vector comprising pixel values of pixels in a $(p+w_p)$-centered image block of the second image, $\nabla I_{2,p}$ indicating a one-dimensional column vector comprising pixel value gradients of the pixels in the $(p+w_p)$-centered image block, $I'_{2,p}$ indicating a one-dimensional column vector comprising pixel means of the pixels in the $(p+w_p)$-centered image block, $\nabla I'_{2,p}$ indicating a one-dimensional column vector comprising pixel value gradient means of the pixels in the $(p+w_p)$-centered image block, and β being a weight and controlling the shape of the function ρ(x).

8. An image alignment apparatus, comprising:
a memory configured to store instructions; and
a processor coupled to the memory and configured to execute the instructions to:
  obtain image information of two to-be-aligned images, image information of a first image comprising coordinates of pixels in the first image in a selected coordinate system, pixel values of the pixels in the first image, and a pixel value gradient of the pixels in the first image, image information of a second image comprising pixel values of pixels in the second image and a pixel value gradient of the pixels in the second image, and the two images being located in the selected coordinate system;
  determine, using a cross-correlation measurement model based on a color cross-correlation and a weighted gradient cross-correlation, a first coordinate offset according to the image information of the two images, the first coordinate offset indicating position deviations of to-be-aligned pixels between the two images in the selected coordinate system; and
  align the two images according to the coordinates of the pixels in the first image in the selected coordinate system and the first coordinate offset.

9. The apparatus according to claim 8, wherein the processor is further configured to execute the instructions to:
  obtain image information of a third image, the image information of the third image comprising pixel values of pixels in the third image and a pixel value gradient of the pixels in the third image, the third image being located in the selected coordinate system, and the first image and the third image being to-be-aligned original images;
  determine, using the cross-correlation measurement model, a coordinate transformation matrix according to image information of the to-be-aligned original images, the coordinate transformation matrix being used to indicate a spatial position relationship of to-be-aligned pixels between the to-be-aligned original images in the selected coordinate system;
  determine second coordinate offset according to the coordinate transformation matrix, the second coordinate offset indicating position deviations of the to-be-aligned pixels between the to-be-aligned original images in the selected coordinate system; and obtain the second image according to the second coordinate offset and the pixel values of the pixels in the third image.

10. The apparatus according to claim 9, the processor is further configured to execute the instructions to determine the coordinate transformation matrix by calculating a minimum value of $$E_1(H) = \sum_p E_2(p, w_p),$$

where $E_2(p,w_p) = \rho(1-|\Phi_I(p,w_p)|) + \tau\rho(1-|_{\nabla I}(p,w_p)|)$ $$\Phi_I(p, w_p) = \frac{(I_{1,p} - I'_{1,p})^T(I_{3,p} - I'_{3,p})}{\|I_{1,p} - I'_{1,p}\|\|I_{3,p} - I'_{3,p}\|},$$

$$\Phi_{\nabla I}(p, w_p) = \frac{(\nabla I_{1,p} - \nabla I'_{1,p})^T(\nabla I_{3,p} - \nabla I'_{3,p})}{\|\nabla I_{1,p} - \nabla I'_{1,p}\|\|\nabla I_{3,p} - \nabla I'_{3,p}\|},$$

$$\rho(x) = -\frac{1}{\beta}\log(e^{-\beta|x|} + e^{-\beta(2-|x|)}),$$

$p=(x_p,y_p)^T$, and $w_p=(u_p,v_p)^T$, H indicating the coordinate transformation matrix and meeting $[u_p,v_p,1]^T = [x_p,y_p,1]^T(H-I)$, I indicating an identity matrix, p indicating the coordinates of the pixels in the first image in the selected coordinate system, $x_p$ indicating a horizontal coordinate of p, $y_p$ indicating a vertical coordinate of p, $w_p$ indicating the second coordinate offset, $u_p$ indicating a horizontal coordinate of $w_p$, $v_p$ indicating a vertical coordinate of $w_p$, $I_{1,p}$ indicating a one-dimensional column vector comprising pixel values of pixels in a p-centered image block of the first image, $\nabla I_{1,p}$ indicating a one-dimensional column vector comprising pixel value gradients of the pixels in the image block, $I'_{1,p}$ indicating a one-dimensional column vector comprising pixel means of the pixels in the image block, $\nabla I'_{1,p}$ indicating a one-dimensional column vector comprising pixel value gradient means of the pixels in the image block, $I_{3,p}$ indicating a one-dimensional column vector comprising pixel values of pixels in a $(p+w_p)$-centered image block of the third image, $\nabla I_{3,p}$ indicating a one-dimensional column vector comprising pixel value gradients of the pixels in the $(p+w_p)$-centered image block, $I'_{3,p}$ indicating a one-dimensional column vector comprising pixel means of the pixels in the $(p+w_p)$-centered image block, $\nabla I'_{3,p}$ indicating a one-dimensional column vector comprising pixel value gradient means of the pixels in the $(p+w_p)$-centered image block, β and τ being constants, β controlling a shape of a function ρ(x), and τ being a weight of $\rho(1-|\Phi_{\nabla I}(p,w_p)|)$ in $E_2(p,w_p)$.

11. The apparatus according to claim 10, the processor is further configured to execute the instructions to determine the second coordinate offset according to a formula $[u_p,v_p,1]^T = [x_p,y_p,1]^T(H-I)$.

12. The apparatus according to claim 11, the processor is further configured to execute the instructions to obtain the second image according to a formula $I_2(p) = I_3(p+w_p)$, $I_2(p)$ indicating a pixel value of the second image in p, and $I_3(p+w_p)$ indicating a pixel value of the third image in $p+w_p$.

13. The apparatus according to claim 8, wherein the processor is further configured to execute the instructions to determine the first coordinate offset according to a formula $$E_3(w'_p) = \sum_p E_2(p, w'_p) + \lambda_1 \sum_p \psi(\|\nabla w'_p\|^2) + \lambda_2 \sum_p \sum_{q \in N(p)} \|w'_p - w'_q\|,$$

where $E_2(p,w'_p) = \rho(1-|\Phi_I(p,w'_p)|) + \tau\rho(1-|\Phi_{\nabla I}(p,w'_p)|)$, wherein $$\Phi_I(p, w'_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w'_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p = (x_p, y_p)^T$, $w'_p = (u'_p, v'_p)^T$, $$\rho(x) = -\frac{1}{\beta}\log(e^{-\beta|x|} + e^{-\beta(2-|x|)}),$$

$\psi(x^2) = \sqrt{x^2 + \varepsilon^2}$, p indicating the coordinates of the pixels in the first image in the selected coordinate system, $x_p$ indicating a horizontal coordinate of p, $y_p$ indicating a vertical coordinate of p, $w'_p$ indicating the first coordinate offset, $u'_p$ indicating a horizontal coordinate of $w'_p$, $v'_p$ indicating a vertical coordinate of $w'_p$, $I_{1,p}$ indicating a one-dimensional column vector comprising pixel values of pixels in a p-centered image block of the first image, $\nabla I_{1,p}$ indicating a one-dimensional column vector comprising pixel value gradients of the pixels in the image block, $I'_{1,p}$ indicating a one-dimensional column vector comprising pixel means of the pixels in the image block, $\nabla I'_{1,p}$ indicating a one-dimensional column vector comprising a pixel value gradient means of the pixels in the image block, $I_{2,p}$ indicating a one-dimensional column vector comprising pixel values of pixels in a $(p+w'_p)$-centered image block of the second image, $\nabla I_{2,p}$ indicating a one-dimensional column vector comprising pixel value gradients of the pixels in the $(p+w'_p)$-centered image block, $I'_{2,p}$ indicating a one-dimensional column vector comprising pixel means of the pixels in the $(p+w'_p)$-centered image block, $\nabla I'_{2,p}$ indicating a one-dimensional column vector comprising pixel value gradient means of the pixels in the $(p+w'_p)$-centered image block, $\lambda_1$, $\beta$, $\lambda_2$ and $\tau$ being constants, $\lambda_1$ and $\lambda_2$ being weights of the second term and the third term in $E_3(w'_p)$, $\beta$ controlling the shape of the function $\rho(x)$, $\tau$ being the weight of $\rho(1-|\Phi_{\nabla I}(p,w'_p)|)$ in $E_2(p,w'_p)$, N(p) indicating a set comprising adjacent pixels of a pixel p in the first image, q indicating any pixel in the set, $w_q$ indicating a coordinate offset between q and a to-be-aligned pixel of q in the second image; and $\varepsilon$ being a constant.

14. The apparatus according to claim 8, the cross-correlation measurement model comprises $E_2(p,w_p) = \rho(1-|\Phi_I(p,w_p)|) + \tau\rho(1-|\Phi_{\nabla I}(p,w_p)|)$, where $$\Phi_I(p, w_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p = (x_p, y_p)^T$, $w_p = (u_p, v_p)^T$, and $$\rho(x) = -\frac{1}{\beta}\log(e^{-\beta|x|} + e^{-\beta(2-|x|)}),$$

p indicating the coordinates of the pixels in the first image in the selected coordinate system, $x_p$ indicating a horizontal coordinate of p, $y_p$ indicating a vertical coordinate of p, $w_p$ indicating the first coordinate offset, $u_p$ indicating a horizontal coordinate of $w_p$, $v_p$ indicating a vertical coordinate of $w_p$, $I_{1,p}$ indicating a one-dimensional column vector comprising pixel values of pixels in the p-centered image block of the first image, $\nabla I_{1,p}$ indicating a one-dimensional column vector comprising pixel value gradients of the pixels in the image block, $I'_{1,p}$ indicating a one-dimensional column vector comprising the pixel means of the pixels in the image block, $\nabla I'_{1,p}$ indicating a one-dimensional column vector comprising pixel value gradient means of the pixels in the image block, $I_{2,p}$ indicating a one-dimensional column vector comprising pixel values of pixels in a $(p+w_p)$-centered image block of the second image, $\nabla I_{2,p}$ indicating a one-dimensional column vector comprising pixel value gradients of the pixels in the $(p+w_p)$-centered image block, $I'_{2,p}$ indicating a one-dimensional column vector comprising pixel means of the pixels in the $(p+w_p)$-centered image block, $\nabla I'_{2,p}$ indicating a one-dimensional column vector comprising pixel value gradient means of the pixels in the $(p+w_p)$-centered image block, and $\beta$ being a weight and controlling the shape of the function $\rho(x)$.

15. The method according to claim 1, wherein the second image is based on image information obtained from one or both of a capture device or an image spectrum that is different from a capture device or an image spectrum of the first image.

16. The apparatus according to claim 8, wherein the second image is based on image information obtained from one or both of a capture device or an image spectrum that is different from a capture device or an image spectrum of the first image.

17. A computer-implemented image alignment method, comprising:
  obtaining image information of a first image comprising coordinates of pixels in the first image in a selected coordinate system, pixel values of the pixels in the first image, and a pixel value gradient of the pixels in the first image, the first image based on image information obtained from a capture device of a first type or obtained in a first image spectrum;
  obtaining image information of a second image comprising pixel values of pixels in the second image in the selected coordinate system and a pixel value gradient of the pixels in the second image, the second image based on image information obtained from a capture device of a second type or obtained in a second image spectrum, at least one of the second type of capture device or the second image spectrum being different from the first type of capture device or the first image spectrum;

determining, using a cross-correlation measurement model based on a color cross-correlation and a weighted gradient cross-correlation, a first coordinate offset according to the image information of the two images, the first coordinate offset indicating position deviations of to-be-aligned pixels between the two images in the selected coordinate system; and aligning the two images according to the coordinates of the pixels in the first image in the selected coordinate system and the first coordinate offset.

18. The method according to claim 17, wherein before determining the first coordinate offset, the method further comprises:

obtaining image information of a third image, the image information of the third image comprising pixel values of pixels in the third image in the selected coordinate system and a pixel value gradient of the pixels in the third image, the third image based on image information obtained from the capture device of the second type or obtained in the second image spectrum, wherein the first image and the third image are to-be-aligned original images;

determining, using the cross-correlation measurement model, a coordinate transformation matrix according to image information of the to-be-aligned original images, wherein the coordinate transformation matrix indicates a spatial position relationship of to-be-aligned pixels between the to-be-aligned original images in the selected coordinate system;

determining a second coordinate offset according to the coordinate transformation matrix, wherein the second coordinate offset is used to indicate position deviations of the to-be-aligned pixels between the to-be-aligned original images in the selected coordinate system; and obtaining the second image according to the second coordinate offset and the pixel values of the pixels in the third image.

19. The method according to claim 17, the cross-correlation measurement model comprises $E_2(p, w_p) = \rho(1 - |\Phi_I(p, w_p)|) + \tau \rho(1 - |\Phi_{\nabla I}(p, w_p)|)$, where $$\Phi_I(p, w_p) = \frac{(I_{1,p} - I'_{1,p})^T (I_{2,p} - I'_{2,p})}{\|I_{1,p} - I'_{1,p}\| \|I_{2,p} - I'_{2,p}\|},$$

$$\Phi_{\nabla I}(p, w_p) = \frac{(\nabla I_{1,p} - \nabla I'_{1,p})^T (\nabla I_{2,p} - \nabla I'_{2,p})}{\|\nabla I_{1,p} - \nabla I'_{1,p}\| \|\nabla I_{2,p} - \nabla I'_{2,p}\|},$$

$p = (x_p, y_p)^T$, $w_p = (u_p, v_p)^T$, and $$\rho(x) = -\frac{1}{\beta} \log(e^{-\beta|x|} + e^{-\beta(2-|x|)}),$$

p indicating the coordinates of the pixels in the first image in the selected coordinate system, $x_p$ indicating a horizontal coordinate of p, $y_p$ indicating a vertical coordinate of p, $w_p$ indicating the first coordinate offset, $u_p$ indicating a horizontal coordinate of $w_p$, $v_p$ indicating a vertical coordinate of $w_p$, $I_{1,p}$ indicating a one-dimensional column vector comprising pixel values of pixels in the p-centered image block of the first image, $\nabla I_{1,p}$ indicating a one-dimensional column vector comprising pixel value gradients of the pixels in the image block, $I'_{1,p}$ indicating a one-dimensional column vector comprising the pixel means of the pixels in the image block, $\nabla I'_{1,p}$ indicating a one-dimensional column vector comprising pixel value gradient means of the pixels in the image block, $I_{2,p}$ indicating a one-dimensional column vector comprising pixel values of pixels in a $(p+w_p)$-centered image block of the second image, $\nabla I_{2,p}$ indicating a one-dimensional column vector comprising pixel value gradients of the pixels in the $(p+w_p)$-centered image block, $I'_{2,p}$ indicating a one-dimensional column vector comprising pixel means of the pixels in the $(p+w_p)$-centered image block, $\nabla I'_{2,p}$ indicating a one-dimensional column vector comprising pixel value gradient means of the pixels in the $(p+w_p)$-centered image block, and $\beta$ being a weight and controlling the shape of the function $\rho(x)$.

20. The method according to claim 19, wherein $\phi_I(p, w_p)$ calculates a cross-correlation between color values of the first image and the second image and $\phi_{\nabla I}(p, w_p)$ calculates a cross-correlation between gradient values of the first image and the second image.

* * * * *

UNITED STATES PATENT AND TRADEMARK OFFICE
CERTIFICATE OF CORRECTION

PATENT NO.        : 10,127,679 B2
APPLICATION NO.   : 15/448799
DATED             : November 13, 2018
INVENTOR(S)       : Xiaoyong Shen, Jiaya Jia and Kwok Wai Hung It is certified that error appears in the above-identified patent and that said Letters Patent is hereby corrected as shown below:

On the Title Page

Item (30), Line 1: "201410452309" should read "201410452309.4"

In the Claims

Column 24, Line 13 (first line following the formulas at the top of the page):

" $\sqrt{X^2 + \varepsilon^2}$ " should read " $\sqrt{x^2 + \varepsilon^2}$ "

Column 24, Line 46 (Claim 7 – Line 3):

" $+\tau\rho(1-|\nabla_I(p,w_p(|)$ " should read " $+\tau\rho(1-|\Phi_{\nabla I}(p,w_p)|)$ "

Column 24, Line 66 (2nd to last line): "$w_p$" should read "$x_p$"

Column 26, Line 4: insert -- wherein -- after "claim 9,"

Column 26, Line 14:

" $E_2(p,w_p)=\rho(1-|\Phi_I(p,w_p)|)+\tau\rho(1-|\nabla_I(p,w_p)|)$ " should read " $E_2(p,w_p) = \rho(1-|\Phi_I(p,w_p)|) + \tau\rho(1-|\Phi_{\nabla I}(p,w_p)|)$ "

Column 26, Line 60 (Claim 11 – 1st line): insert -- wherein -- after "claim 10,"

Column 26, Line 64 (Claim 12 – 1st line): insert -- wherein -- after "claim 11,"

Signed and Sealed this
Eighth Day of January, 2019

Andrei Iancu
*Director of the United States Patent and Trademark Office*

CERTIFICATE OF CORRECTION (continued)
U.S. Pat. No. 10,127,679 B2

Column 27, Line 12:

" $E_2(p,w'_p)=\rho(1-|\Phi_I(p,w'_p)|)+\tau\rho(1-|\Phi_{\nabla I}(p,w'_p)|),$ " should read " $E_2(p,w'_p) = \rho(1-|\Phi_I(p,w'_p)|) + \tau\rho(1-|\Phi_{\nabla I}(p,w'_p)|)$ , "

Column 27, Line 13: delete "wherein"

Column 27, Line 32:

" $\psi(x^2)=\sqrt{x^2+\varepsilon^2}$ " should read " $\psi(x^2) = \sqrt{x^2+\varepsilon^2}$ "

Column 27, Line 63 (Claim 14 – 1st line): insert -- wherein -- after "claim 8,"